(12) United States Patent
Troia et al.

(10) Patent No.: US 11,163,896 B2
(45) Date of Patent: Nov. 2, 2021

(54) SECURE COMMUNICATIONS AMONGST CONNECTED DICE

(71) Applicant: Micron Technology, Inc., Boise, ID (US)

(72) Inventors: Alberto Troia, Munich (DE); Antonino Mondello, Messina (IT)

(73) Assignee: Micron Technology, Inc., Boise, ID (US)

( * ) Notice: Subject to any disclaimer, the term of this patent is extended or adjusted under 35 U.S.C. 154(b) by 297 days.

(21) Appl. No.: 16/363,132

(22) Filed: Mar. 25, 2019

(65) Prior Publication Data

US 2020/0311291 A1    Oct. 1, 2020

(51) Int. Cl.
*G06F 21/60* (2013.01)
*H04L 9/32* (2006.01)
*H04L 9/08* (2006.01)
*H04L 9/06* (2006.01)

(52) U.S. Cl.
CPC .......... *G06F 21/606* (2013.01); *H04L 9/0643* (2013.01); *H04L 9/0825* (2013.01); *H04L 9/0894* (2013.01); *H04L 9/3226* (2013.01); *H04L 9/3247* (2013.01); *H04L 9/3263* (2013.01)

(58) Field of Classification Search
CPC ........ G06F 21/606; G06F 21/64; G06F 21/72; H04L 9/3247; H04L 9/0825; H04L 9/3263; H04L 9/0643; H04L 9/0894; H04L 9/3226; H04L 9/14; H04L 9/0861; H04L 2209/26; H01L 21/56
See application file for complete search history.

(56) References Cited

U.S. PATENT DOCUMENTS

| | | | | |
|---|---|---|---|---|
| 10,735,205 B1* | 8/2020 | Wentz | ................... | H04L 9/3257 |
| 10,742,421 B1* | 8/2020 | Wentz | ................... | H04L 9/3278 |
| 2011/0264917 A1* | 10/2011 | Barthelemy | ............ | H04L 9/321 |
| | | | | 713/176 |
| 2019/0312734 A1* | 10/2019 | Wentz | ................... | H04L 9/3247 |
| 2020/0007331 A1* | 1/2020 | Wentz | ................... | H04L 9/321 |
| 2020/0052898 A1* | 2/2020 | Wentz | ................... | H04L 9/3239 |
| 2020/0076829 A1* | 3/2020 | Wentz | ................... | H04L 9/3297 |
| 2020/0112442 A1* | 4/2020 | Wentz | ................... | H04L 9/3247 |
| 2020/0153624 A1* | 5/2020 | Wentz | ................... | G06F 21/32 |
| 2020/0153627 A1* | 5/2020 | Wentz | ................... | G06F 21/6209 |
| 2020/0162251 A1* | 5/2020 | Wentz | ................... | H04L 9/0894 |
| 2020/0162268 A1* | 5/2020 | Wentz | ................... | H04L 9/3239 |
| 2020/0201679 A1* | 6/2020 | Wentz | ..................... | G06F 16/29 |
| 2020/0296128 A1* | 9/2020 | Wentz | ................... | H04L 63/1433 |
| 2020/0320340 A1* | 10/2020 | Wentz | ................. | G06K 9/6221 |

(Continued)

*Primary Examiner* — J. Brant Murphy

(74) *Attorney, Agent, or Firm* — Greenberg Traurig

(57) ABSTRACT

A plurality of dice having at least a first die and a second die. The first die can generate a measure of the first die using a cryptographic algorithm, a public key and a private key, and a digital signature according to the measure and the private key. The digital signature can include a digest encrypted by the private key. The digest can include the measure. The first die can communicate the measure, the digital signature, and the public key to the second die. The second die can store a validation code representative of a measure of the first die and validate the digital signature using the public key as well validate the measure by comparing the measure to the validation code.

20 Claims, 10 Drawing Sheets

(56) References Cited

U.S. PATENT DOCUMENTS

2020/0351089 A1* 11/2020 Wentz .................. G06Q 20/401
2020/0351098 A1* 11/2020 Wentz ................... H04L 9/3234
2020/0351657 A1* 11/2020 Wentz ................... H04W 12/06
2020/0356085 A1* 11/2020 Wentz .............. G05B 19/41875

* cited by examiner

| Intra-Die Communication | 200 |
|---|---|
| (Firmware + Parameters) Measure Die #N-1 | 202 |
| Additional Information (e.g., Freshness Factor) | 204 |
| 206 — Digital Signature (signed with Die #N-1's private key and verified by a public key stored in Die #N) | |

FIG. 2

| Intra-Die Communication | 300 |
|---|---|
| Immutable Information | 308 |
| (Firmware + Parameters) Measure Die #N-1 | 302 |
| Additional Information (e.g., Freshness Factor) | 304 |
| 306 — Digital Signature (signed with Die #N-1's private key and verified by Die #N's public key) | |

FIG. 3

SECURE COMMUNICATIONS AMONGST CONNECTED DICE

FIELD OF THE TECHNOLOGY

At least some embodiments disclosed herein relate to secure communications amongst connected dice in general, and more particularly, to secure communications amongst connected dice using asymmetric cryptography.

BACKGROUND

A multi-chip package (MCP) is an electronic assembly including a package where multiple integrated circuits (ICs), semiconductor dice and/or other electronics components are integrated. Such parts are usually combined on a substrate, so that the parts are treated as a single component. A MCP can include one or more hybrid integrated circuits and stacked dice in a vertical arrangement. A MCP can include dice arranged in a horizontal and/or vertical manner.

Asymmetric cryptography, also known as public-key cryptography, is a cryptographic system that uses pairs of keys: public keys which may be disseminated widely, and private keys which are known only to the owners of the private keys. Asymmetric cryptography provides authentication in that the public key verifies that a holder of the paired private key sent the message, and encryption in that only the paired private key holder can decrypt the message encrypted with the public key. In an asymmetric cryptography system, any person can encrypt a message using the receiver's public key. That encrypted message can only be decrypted with the receiver's private key. Effective security requires keeping the private key private, and the public key can be openly distributed.

Inter-dice communications can be used between die of a package to communicate power consumption information. Inter-dice communications protocols can be used to monitor power consumption and determine allocation of power consumption to reduce power consumption in a package of dice.

A problem with inter-dice communications and corresponding protocols is such communications and protocols are vulnerable to attacks from threat actors. For example, hardware and software based attacks can be performed to access inter-dice communications. Managed NAND devices and MCP are just a few of the technologies that are vulnerable to such attacks, since it is common that such technologies are produced without consideration of threat actors exploiting gaps in inter-dice communications and corresponding protocols.

BRIEF DESCRIPTION OF THE DRAWINGS

The present disclosure will be understood more fully from the detailed description given below and from the accompanying drawings of various embodiments of the disclosure.

FIGS. 2-3 each illustrate example data included in an example communication sent from an example DIE #N–1 to an example DIE #N, in accordance with some embodiments of the present disclosure.

DETAILED DESCRIPTION

Figure 1:
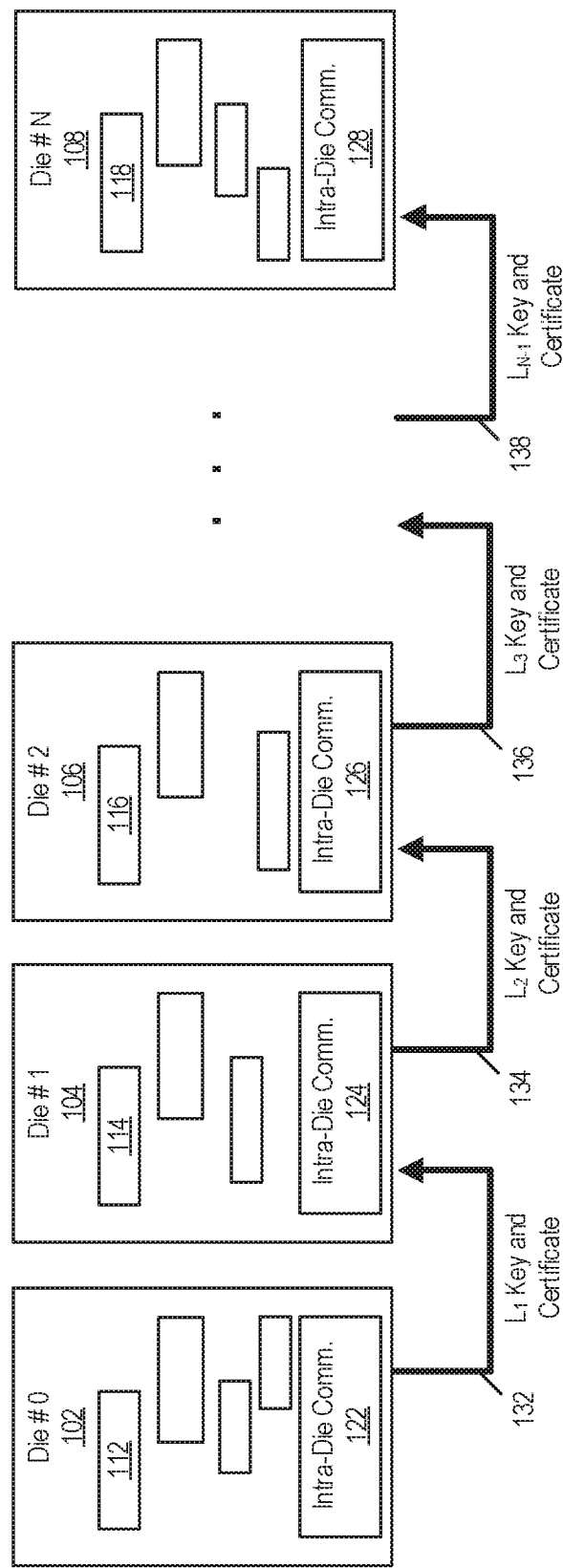
FIG. 1 illustrates example handshaking between a set of dice using asymmetric cryptography, in accordance with some embodiments of the present disclosure.

In at least some embodiments, asymmetric cryptography is used to secure communications amongst connected dice.

In general, examples of the systems and methods disclosed herein for securing communications amongst connected dice provide specific technical solutions to at least the technical problems mentioned in the background section and other parts of the application as well as other technical problems not described herein but recognized by those of skill in the art.

The connected dice can be parts of one or more MCPs, MNANDs, MDRAMs, and/or other multiple-die devices. The connected dice can be connected over one or more vias, buses, and/or computer networks. Asymmetric cryptography can be used to secure the inter-dice communications amongst the connected dice and validate the dice as belonging to a single component. For example, a die in the group (such as a NAND die) can include an internal cryptographic algorithm and a space for a secret key. The algorithm can be used to generated and/or validate a public key. The public key can be validated through a corresponding certificate for the die. Also, the validity of dice activity and inter-dice communications can be confirmed through a space to store a measure of firmware and a parameter area of a preceding die in the group of dice, e.g., a group of dice in a stack of NAND devices.

For example, when a NAND MCP and/or a MNAND device is built and tested, a secret key can be injected in the grouped and/or stacked devices. In some embodiments, only one device or die will act as a master. The master device or die can store the secret key and can generate $L_0$ and $L_1$ layers of an identity composition of a device or system, such as and identity composition of a system of multiple interconnected dice. Using inter-dice communication, a public key and a certificate can be transferred from a master device or die to a second device or die in the group or stack. The second device or die can validate the information, and generate its own public key and certificate for communicating to a third device or die, and so on. This process can be followed until the entire group or stack is verified.

Immutable information can also be transferred from one device or die to another. The immutable information can be a unique identifier (UID) and/or any other unique code stored inside the device or die.

In some embodiments, the disclosed technology provides an option to avoid hardware attacks to leak software secrets from components of a stack of NAND dice. Opening the package of dice and reading from the NAND is forbidden unless the chain is internally validated by a master die. For example, this provides at least two innovations: (1) to generate a NAND device compatible with a device identity composition system (such as DICE-RIoT protocol), and (2) to generate a secure protocol to ensure the NAND stack functionality. The whole stack is operative only if the messages are recognized valid. This can be extended to a whole system in PCB and distributed systems.

In some embodiments, the disclosed technology can use DICE-RIoT as a technology to secure the inter-dice communications in an MCP, MNAND, or MDRAM (such as a managed NAND device having a stack of NAND dice). Inter-dice communications already exist in such devices and one example problem is that dice are vulnerable to attacks. An example solution to the attacks is to validate the entire multiple-die device using an identity composition system (e.g., DICE-RIoT) with the inter-dice communication.

In some embodiments, each die in a plurality of dice (such as each NAND die in a stack) can implement an internal cryptographic algorithm as well as include space for a secret key. Also, each die can implement an algorithm to generate and validate a public key through a certificate. Also, each die can include a space to store measure of the firmware as well as a parameter area of the previous die of the plurality of dice.

The secret key (or multiple keys) can be embedded in the MCP(s) during manufacturing. One die (such as one NAND die) can act as a master having the secret key to generate layers of the identity composition system. Using the inter-dice communications, the public key and the certificate of the master die can be transferred to the second die of the plurality of dice; and the second to the third, and so on. The subsequent die validates the information of the preceding die, and then generates a new public key and certificate. This pattern can be followed until the entire group of dice is verified. Immutable information can also be stored in each die and can be a NAND UID and/or any other unique code.

The key and the certificate for each die (or to put it another way, for each level of the identity composition system) can allow a MCP or a controller connected to the MCP to identify uniquely a chain of dice. Each information packet communicated from die-to-die can include a measure of a die and its digital signature. Also, the packet can include the immutable information of the die. The digital signature can be derived from the private key and measure as well as additional information. In some embodiments, each die, during the fabrication process, can be configured as a specific position of the chain such that it can store the measure of the previous die.

If the content of the packet from the sending die (or preceding die) is different from the stored information inside the receiving die (or subsequent die), e.g., stored content can be firmware and parameter measure, the receiving die and/or the entire plurality of dice can be deactivated and the content of the die(s) is restricted from being read. Or, the failing die that cannot be validated can be deactivated only, in some other embodiments. Otherwise, the content of the dice or die is read. And, if an error occurs, and then a next communication is accurate after the error occurred, the die and/or dice can be restored to be read.

In some embodiments, asymmetric cryptography can be used for authentication between connected dice, which can be found in the implementation of the certificates, digital signatures on the exchanged messages, and/or the device identity composition system. When the dice are in a sequence each following die has a public key of the preceding die derived from a cryptographic algorithm. The following die can accept the public key and certificate of the preceding die. Also, the received certificate can confirm the identity of the preceding die.

In some embodiments, the device identity composition system can be used for the asymmetric cryptography. In such embodiments, the private key can be or can be based on a secret value called Unique Device Secret (UDS) that is injected during manufacture of a die. Also, in some embodiments, the device identity composition system can include layer $L_0$ that derives $K_{L0}$, the Fuse Derived Secret (FDS), by using a key derivative function (KDF). Algorithmically, $K_{L0}$=KDF [UDS, HASH("Identity of $L_1$")]. The other layers (Lk) can provide to the next ones (Lk+1) a set of keys and certificates. The layers being layers of a sequence of dice starting with the immutable loader $L_0$, then an initial die's device identity composition system $L_1$, a second die's device identity composition system $L_2$, and following die's device identity composition system $L_{k+1}$. Each layer can provide integrity for the next layer and so on. And, each layer can verify the certificates showing identities of the dice of the sequence of dice.

The methods and system described herein can provide an option to avoid hardware and/or software attacks to leak information from components that are intended to be secret. In some embodiments, actors trying to open a package or group of dice and reading from the dice is forbidden unless a chain of the dice is internally validated by a master die.

The techniques provide a way to generate one or more MCPs compatible with a device identity composition system and to generate a secure protocol to ensure the functionality of the one or more MCPs is secured. In some embodiments, the whole of the MCP(s) is operative only if the messages sent from one die to another are recognized as valid. Such techniques can be extended to a whole system on a printed circuit board (PCB) and/or distributed computing systems.

FIG. 1 illustrates example handshaking between a set of dice using asymmetric cryptography, in accordance with some embodiments of the present disclosure. Depicted is handshaking between a plurality of dice (e.g., die 102, die 104, die 106, and die 108). Each die includes a firmware and parameters area (e.g., area 112, area 114, area 116, and area 118). Also, each die includes an inter-die communications interface (e.g., see inter-die communications interfaces 122, 124, 126, and 128). As depicted, each communications interface is communicating a message from one die to another (e.g., see messages 132, 134, 136, and 138). The messages can include a key and a certificate for each die (or to put it another way, each level of an identity composition system for the dice) that can allow a MCP or a controller connected to the MCP to identify uniquely the chain of dice. Each message or information packet communicated from die to die can include a measure of a die and its digital signature. Also, the message can include the immutable information of the die.

As illustrated by FIG. 1, the chain of dice is using an inter-dice communications protocol. Alternatively, a separate controller can perform at least part of the protocol.

Also, the depicted key and certificate can allow to identify uniquely the chain of dice. The proper certification probation can be done receiving information from each die, such as a UID of the die, firmware measure and/or parameter measure of the die, and the like. Die 102 can be configured as a master die and can be able to recognize the information sent from the other dice, which includes information that has been signed and encrypted.

FIGS. 2-3 each illustrate example data included in an example communication (or message) sent from an example DIE #N−1 to an example DIE #N, in accordance with some embodiments of the present disclosure. In FIG. 2, depicted is an inter-die communication 200 (which is a message) from a die #N−1 that includes a measure 202 of firmware and parameters of the die #N−1, additional information 204 (e.g., a freshness factor), and a digital signature 206. As illustrated, the digital signature 206 is signed with die #N−1's private key and can be verified by a public key stored in die #N. The die #N−1 can communicate the public key to the die #N for use of the key. Somewhat similarly, in FIG. 3, depicted is an inter-die communication 300 (which is a message) from a die #N−1 that includes a measure 302 of firmware and parameters of the die #N−1, additional information 304 (e.g., a freshness factor), and a digital signature 306. As illustrated, the digital signature 306 is signed with die #N−1's private key and can be verified by a public key stored in die #N. The die #N−1 can communicate the public key to the die #N for use of the key. Also, FIG. 3 depicts immutable information 308 which is included in the inter-die communication 300.

In general, the validation of the plurality of dice is executed through a measure operation and verification of the measure operation result, such as measures 202 and 302. Aspects of internal firmware of a die (such as a NAND die) can be sent to a cryptographic algorithm that can calculate the measure of the firmware. Aspects of parameters of the of the die can also be sent to the cryptographic algorithm that can calculate the measure of the parameters. The measure can be a combination of the firmware and the parameters, such as a hash of the firmware and the parameters. The key can be used to generate digital signature (such as signatures 206 and 306) to securely send the measure (such as measures 202 and 302) to the next die or the master die.

The aforesaid verification aspects and steps can be assisted by having each die configured as having a specific position in the chain of die. The configuration can occur at the fabrication of the die or afterwards. The configuration can also include creating a space in the die to store the measure of the preceding die as a validation code (also known as a "golden value").

In some embodiments, the message, sent through the inter-dice communication, can include information that validates and then allows the chain or package to activate the functionality of the die. If, for example, content of the message is different from a validation code inside the subsequent die, the die can be deactivated and the content cannot be read. Also, the entire chain of die can be deactivated when a message does not match the validation code of the next die. After a validation failure, the functionality of the die or the entire chain can return only when the message matches the validation code in another verification process after the failure. The die subsequent to the master die can store the validation code or have the code embedded during fabrication.

Figure 4:
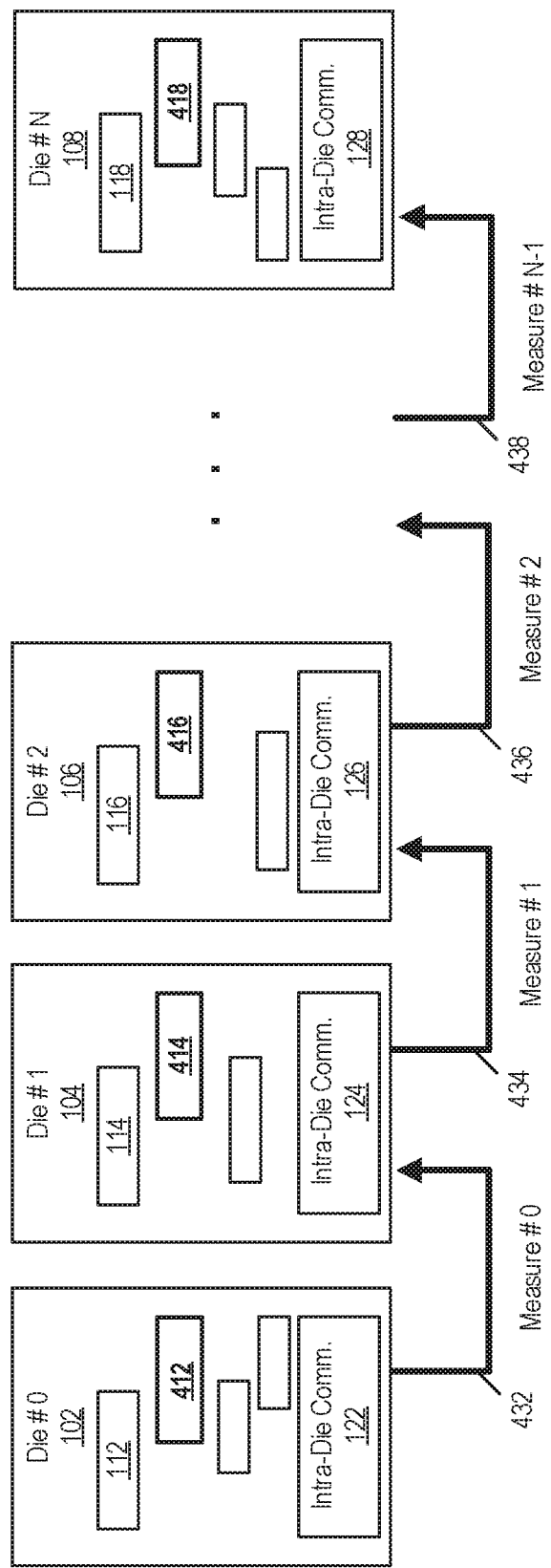
FIG. 4 illustrates example communications of validation messages, in accordance with some embodiments of the present disclosure.

FIG. 4 illustrates example communications of validation messages, in accordance with some embodiments of the present disclosure. As shown in FIG. 4, the dice depicted in FIG. 1 also include an area for storing a validation code (or golden value), e.g., see areas 412, 414, 416, and 418. Also, shown in FIG. 4, are messages 432, 434, 436, and 438. Such messages can include the data illustrated in the messages of FIGS. 2 and 3, so that the messages, sent through the inter-dice communications, can include information that validates and then allows the chain or package to activate the functionality of the dice. If, for example, content of one of the messages 432, 434, 436, or 438 is different from a validation code inside a respective subsequent die (such as a validation code stored in one of areas 414, 416, and 418), the corresponding die can be deactivated and the content of the die cannot be read. Specifically, for example, in some embodiments, die 102 operates only if the message 432 matches the validation code stored in area 414. Also, for example, die 104 operates only if the message 434 matches the validation code stored in area 416, and so on.

Referring to FIGS. 1-4, depicted is a system for securing communications as well as functionality amongst connected dice (e.g., dice 102, 104, 106, and 108) using asymmetric cryptography and a golden value (or a validation code). The connected dice can be dice of one or more MCPs. In examples, where the dice are distributed amongst multiple MCPs, the MCPs and/or dice can communicate messages (e.g., see messages 132, 134, 136, 138, and communications 200 and 300, as well as messages 432, 434, 436, and 438) over a bus (e.g., see bus 804 depicted in FIG. 8) and/or a computer network (e.g., see network(s) 714 depicted in FIG. 7).

For example, a MCP can include first and second dice of a plurality of dice. The first die (e.g., die 102) can be configured to generate a first measure of firmware and parameters of the first die using a cryptographic algorithm (e.g., the measure stored in area 112). The first die can also be configured to generate a first public key and a first private key. The first die can also be configured to generate a first digital signature (e.g., signature 206 or 306) according to the first measure and the first private key. The first digital signature can include a first digest encrypted by the first private key, and the first digest can include a derivative, e.g., a hash, of the first measure. The first die can also be configured to communicate, via a first inter-die communication interface (e.g., interface 122), the first measure, the first digital signature, and the first public key to the second die (e.g., die 104).

In such an example, the second die can be configured to store a first validation code (e.g., the code stored in area 414) representative of a measure of the firmware and the parameters of the first die using the cryptographic algorithm. The second die can also be configured to receive, via a second inter-die communication interface (e.g., interface 124), the first measure, the first digital signature, and the first public key. The second die can also be configured to validate the first digital signature using the first public key and validate the first measure by comparing the first measure to the first validation code.

In such an example, the first digital signature can be generated also according to additional information that changes periodically (e.g., see additional information 204 and 304). For example, the first digest can include a freshness factor such as a timestamp, a code, and/or a sequence number.

In such an example, the first die can be further configured to communicate a first immutable identifier (e.g., immutable information 308) of the first die with the first measure and the first digital signature.

In such an example, the second die can be further configured to generate a second measure of firmware and parameters of the second die using the cryptographic algorithm (e.g., the measure stored in area 114). The second die can be further configured to generate a second public key and a second private key. Also, the second die can be further configured to generate a second digital signature (e.g., signature 206 or 306) according to the second measure and the second private key. The second digital signature can include a second digest encrypted by the second private key, and the second digest can include the second measure. The second die can also be further configured to communicate, via a second inter-die communication interface (e.g., interface 124), the second measure, the second digital signature, and the second public key to a third die of the plurality of dice (e.g., see die 106).

In such an example, the second digital signature can be generated also according to additional information that changes periodically (e.g., see additional information 204 and 304). For example, the second digest can include a freshness factor such as a timestamp, a code, and/or a sequence number.

In such an example, the second die can be further configured to communicate a second immutable identifier (e.g., immutable information 308) of the second die with the second measure and the second digital signature.

In such an example and other embodiments, the cryptographic algorithm can include a hash function, and the measures can include hash values.

In such an example and other embodiments, the plurality of dice can further include an embedded secret key. In the aforesaid example, the first die can store the secret key and can operate as a master die with respect to the other dice of the plurality of dice. Also, the first die can include a first identity composition device (e.g., see the identity composition device depicted in FIG. 9) configured to generate a root layer of information for authentication of the MCP based at least on the stored secret key. The first identity composition device can also be configured to generate a first layer of information for authentication of the MCP based on the root layer of information. The first layer of information can include the first public key, a first certificate for the first die, and an immutable identifier of the first die, and the first certificate can be used to validate the first public key received in the second die.

Also, in the aforesaid example, the second die can include a second identity composition device (e.g., see the identity composition device depicted in FIG. 10) configured to generate a second layer of information for authentication of the MCP based on the first layer of information. The second layer of information can include a second public key for the second die, a second certificate for the second die, and an immutable identifier of the second die, and the second certificate can be used to validate the second public key received in the third die.

In such an example and other embodiments, the plurality of dice is arranged in a sequential chain of dice and each die of the chain is configured as being in a specific position in the chain. The first die can be an initial die in the chain, the second die can be a die in the chain immediately following the first die, and each die subsequent to the second die in the chain can be configured to store a validation code representative of a predetermined measure of firmware and parameters of a preceding die calculated according to the cryptographic algorithm. Each die subsequent to the second die in the chain can also be configured to store a measure of the firmware and parameters of the preceding die calculated from the cryptographic algorithm, as well as store a digital signature, a public key, and a certificate of the preceding die. Each die subsequent to the second die in the chain can also be configured to validate the public key using the certificate, validate the digital signature using the public key, and validate the measure by comparing the measure to the validation code. The sequential chain of dice can be validated one die at a time until each die of the chain is validated.

In such an example and other embodiments, the first die can be a master die and the other dice of the plurality of dice can be slave dice arranged in a sequential chain of slave dice after the master die. The second die cam be an initial die in the sequential chain of slave dice. The validation of the MCP can occur by the master die validating an authentication message of each slave die. The authentication message can include a digital signature and a measure of the slave die. The digital signature can be validated by a public key of the slave die. The measure can be validated by a validation code of the slave die, and the validation code can be representative of a predetermined measure of the slave die.

Each slave die of the chain can configured as being in a specific position in the chain and each slave die can be configured to store the public key, a certificate, and the measure of a preceding die in the chain. The certificate can be used to validate the public key of the preceding die, in the slave die.

In such an example and other embodiments, if the validation of the first measure or any other measure of the plurality of dice fails, then the MCP can be deactivated and content of the MCP can be prohibited from being read.

In such an example and other embodiments, if the validation of the first measure or any other measure of the plurality of dice fails, then the corresponding die can be deactivated and content of the corresponding die can be prohibited from being read.

In such an example and other embodiments, the first die can include a first NAND device, and the second die can include a second NAND device.

Figure 5A:
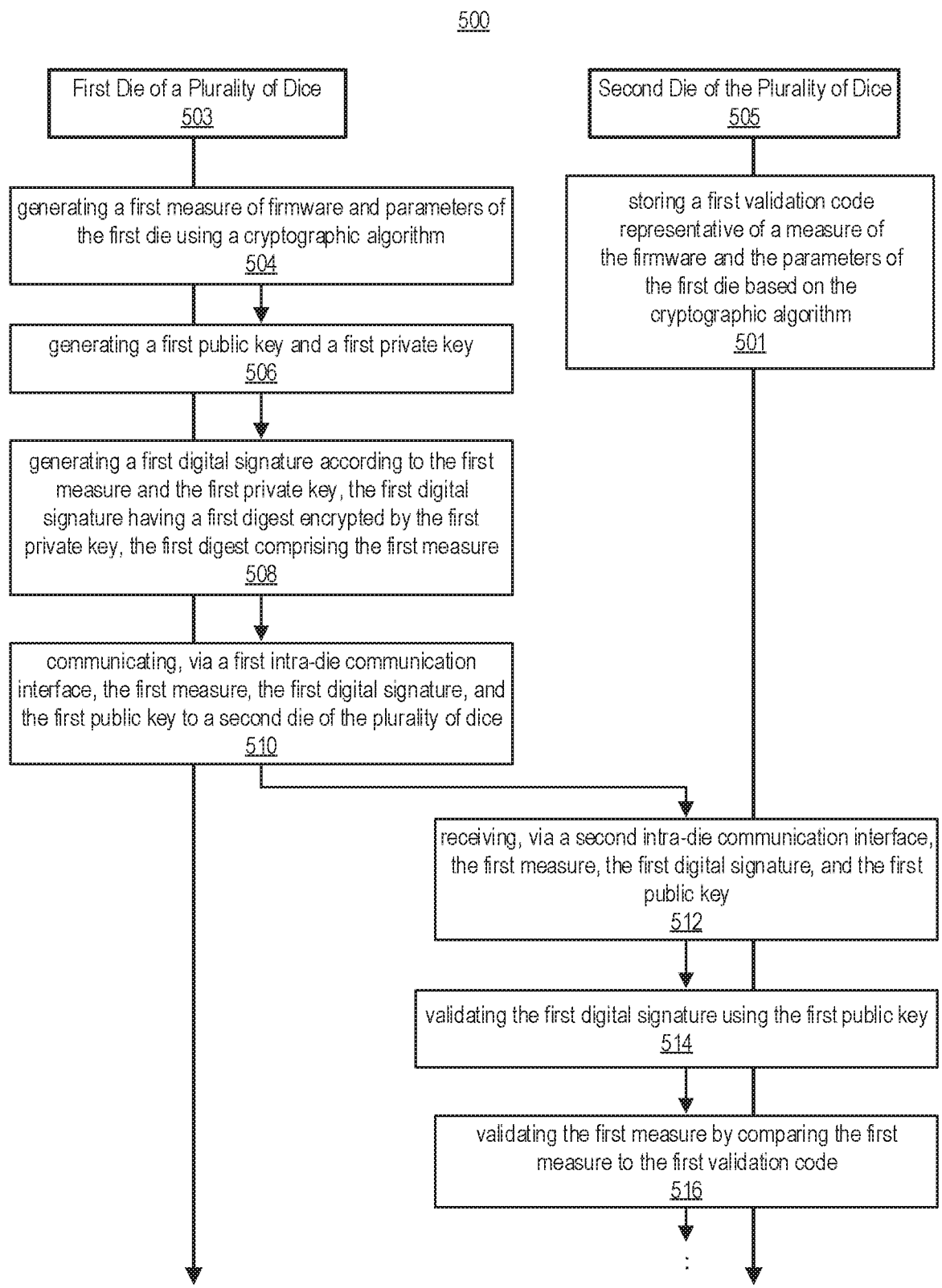
FIGS. 5A, 5B, and 6 each illustrate flow diagrams of example operations performed by example dice, in accordance with some embodiments of the present disclosure.
Figure 5B:
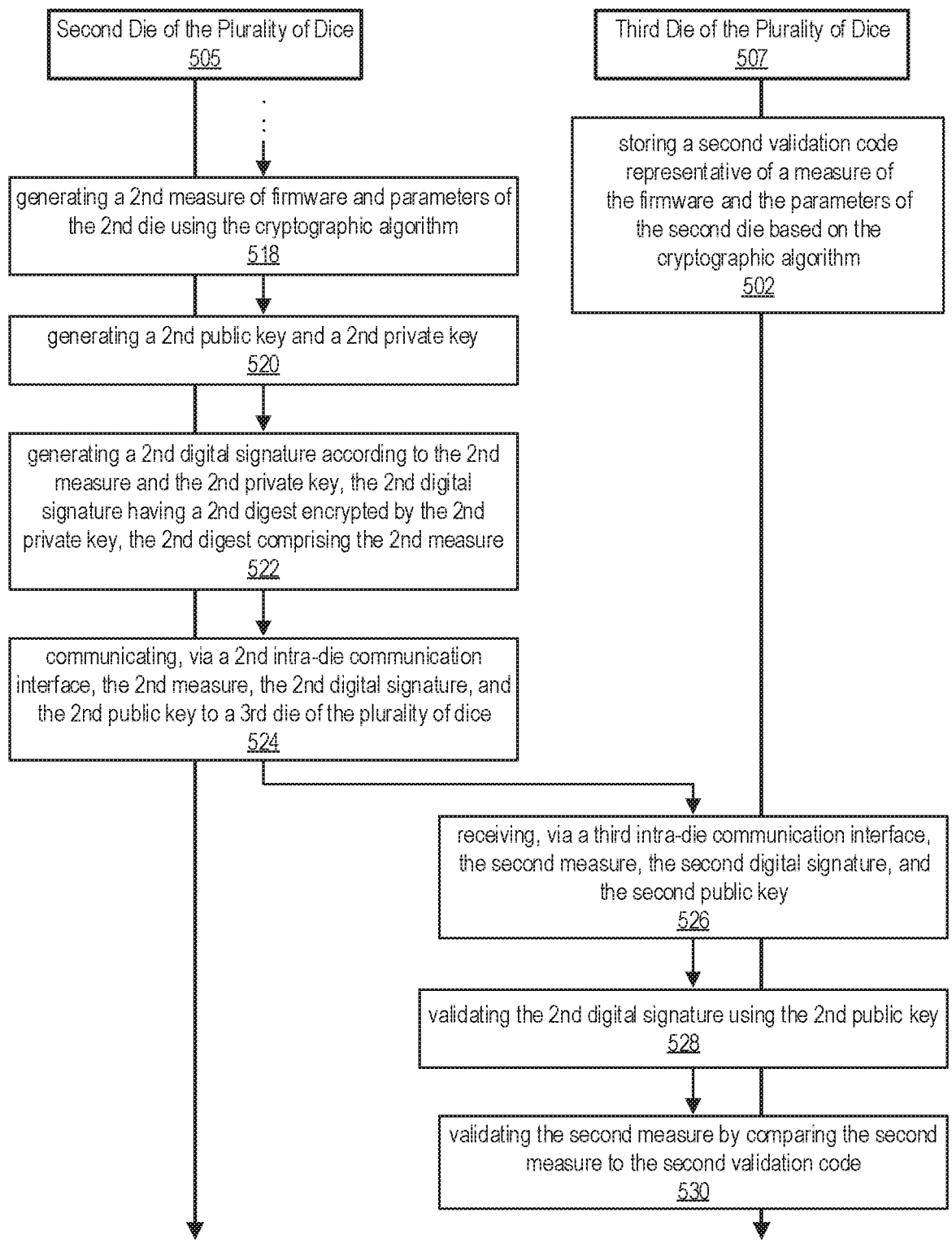
Figure 6:
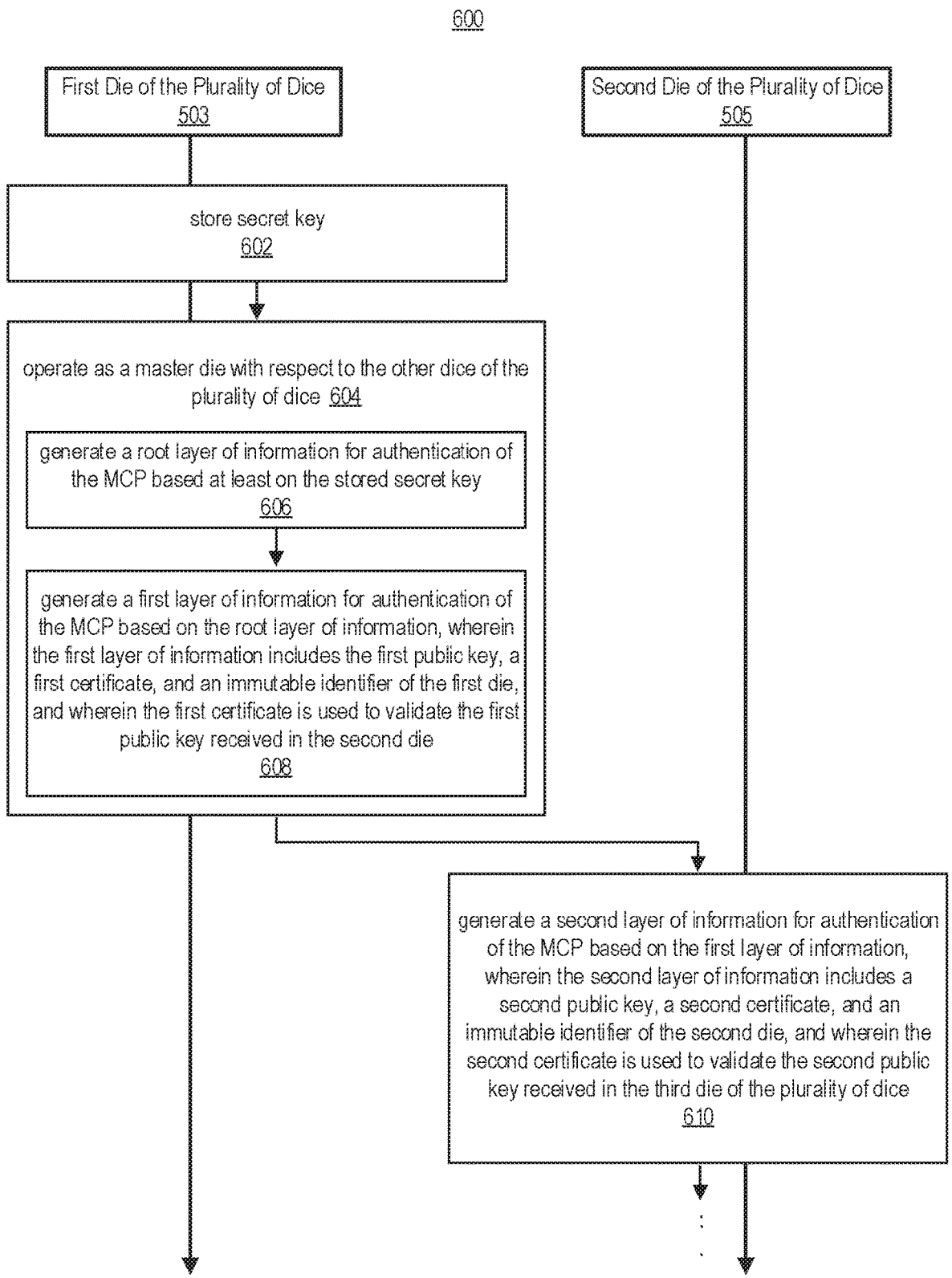

FIGS. 5A, 5B, and 6 each illustrate flow diagrams of example operations performed by example dice, in accordance with some embodiments of the present disclosure.

Figure 7:
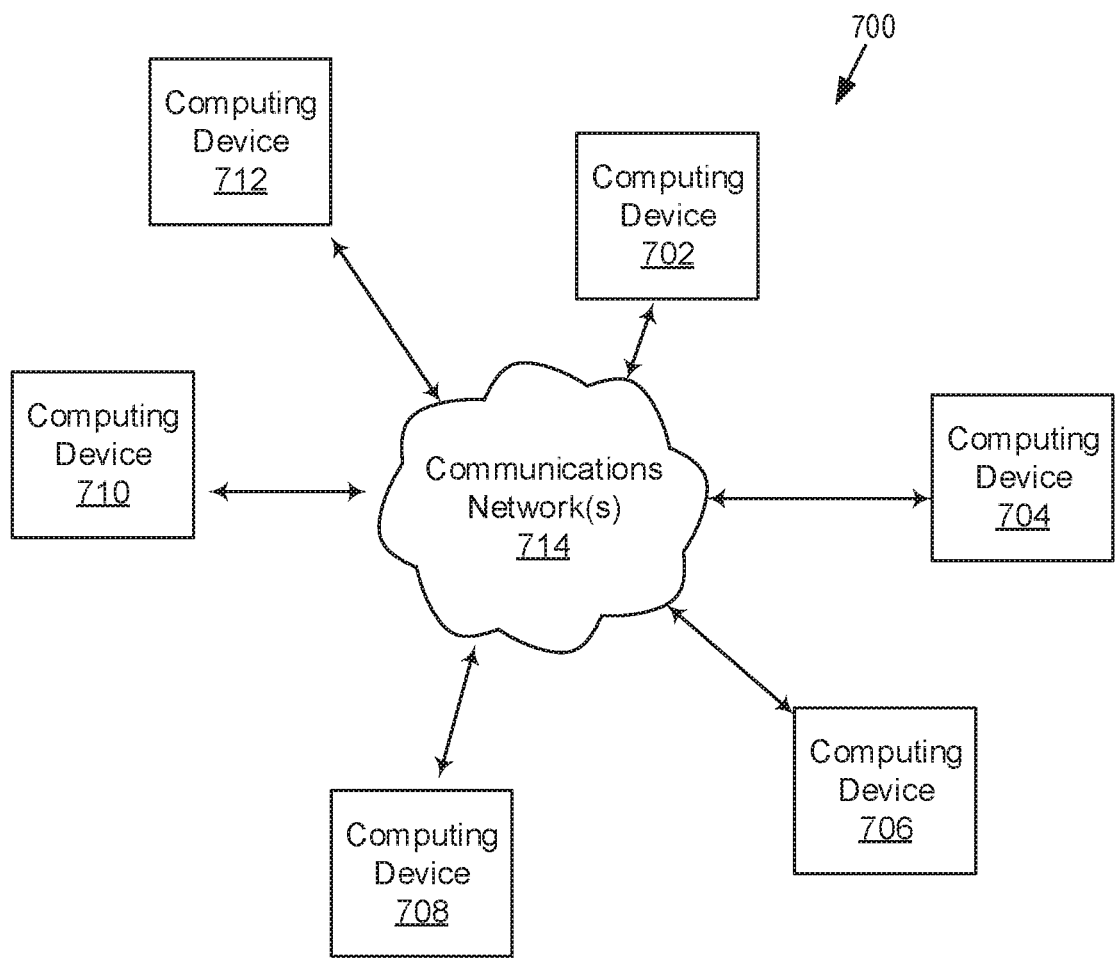
FIG. 7 illustrates an example computing system that can implement to secure communications amongst connected dice using asymmetric cryptography, in accordance with some embodiments of the present disclosure.

Specifically, FIGS. 5A and 5B illustrate operations of method 500 performed by first die 503, second die 505, and third die 507 of a plurality of dice. The plurality of dice can be dice of a MCP or dice of a plurality of MCP, e.g., see MCP(s) 802 depicted in FIG. 8, and/or dice distributed over a network, e.g., dice of a plurality of MCP of computing devices 702-712 that are distributed dice over network(s) 714 as shown in FIG. 7. In some embodiments, the first, second, or third die, or any combination thereof, of any combination of the dice can include one or more NAND devices. In some embodiments, each die of the dice is a NAND device.

In FIG. 5A, the method 500 begins at step 501 (shown in FIG. 5A), with storing, by the second die, a first validation code (also known as a "golden value") representative of a measure of the firmware and the parameters of the first die based on the cryptographic algorithm. Also, at step 502 (shown in FIG. 5B), the method 500 can begin with storing, by the third die, a second validation code representative of a measure of the firmware and the parameters of the second die based on the cryptographic algorithm. In general, the method can begin with storing, by a subsequent die, a validation code (or golden value) representative of a measure of the firmware and the parameters of the previous die based on the cryptographic algorithm. And, the cryptographic algorithm can include a hash function, and the measure of a die can include hash values (such as the first measure can include hash values).

At step 504, the method 500 continues with generating, by the first die, a first measure of firmware and parameters of the first die using a cryptographic algorithm. In general, the method can include generating, by any die of the dice, a measure of firmware and parameters of the die using a cryptographic algorithm.

At step 506, the method 500 continues with generating, by the first die, a first public key and a first private key. In general, the method can include generating, by any die of the dice, a public key and a private key. The first die as well as other die of the dice, can generate a public key and a private key for authentication and/or validation of the die by other dice.

At step 508, the method 500 continues with generating, by the first die, a first digital signature according to the first measure and the first private key. The first digital signature includes a first digest encrypted by the first private key. The first digest can include a derivative, e.g., a hash, of the first measure. In general, the method can include generating, by any die of the dice, a digital signature according to a measure of the die and a private key of the die. The digital signature, in general can include a digest encrypted by the private key, and the digest can include the measure.

The first signature can be generated also according to additional information that changes periodically. In general, a digest can include a measure of a die and can be encrypted by the private key of the die. Also, the additional information that changes periodically can include a timestamp, a code, and/or a sequence number, for example. In some embodiments, every time a die of a set of dice sends the measure of itself to the subsequent die, it has to be sent with additional information that changes from time to time (e.g., a timestamp, a code, a sequence number, etc.), so that a threat actor attempting to attack the dice cannot record the content of one communication by the die and then used it to pretend that it is the die.

At step 510, the method 500 continues with communicating, via a first inter-die communication interface of the first die, the first measure, the first digital signature, and the first public key to the second die. In general, the method can include communicating, via an inter-die communication interface of a prior die of the dice, the measure, the digital signature, and the public key of the prior die to a subsequent die of the dice. In some embodiments, the first die can also communicate a first immutable identifier of the first die with the first measure and the first digital signature. In general, a die of the dice can also communicate an immutable identifier of itself with the communication of its measure and digital signature.

At step 512, the method 500 continues with receiving, via a second inter-die communication interface of the second die, the first measure, the first digital signature, and the first public key. In general, the method can include receiving, via an inter-die communication interface of a subsequent die of the dice, the measure, the digital signature, and the public key of a prior die of the dice.

At step 514, the method 500 continues with validating, by the second die, the first digital signature using the first public key. In general, the method can include validating, by a die of the dice, a digital signature of a preceding die using the public key of the preceding die.

At step 516, the method 500 continues with validating, by the second die, the first measure by comparing the first measure to the first validation code. In general, the method can include validating, by a die of the dice, a measure of a preceding die by comparing the measure to a validation code stored in the die. If the validation of the first measure or any other measure of the plurality of dice fails, then the corresponding die is deactivated and content of the corresponding die is prohibited from being read. Alternatively, if the validation of the first measure or any other measure of the plurality of dice fails, then the entire MCP is deactivated and content of the MCP is prohibited from being read.

In FIG. 5B, at step 518, the method 500 continues with generating, by the second die, a second measure of firmware and parameters of the second die using a cryptographic algorithm.

At step 520, the method 500 continues with generating, by the second die, a second public key and a second private key. The second die as well as other die of the dice, can generate a public key and a private key for authentication and/or validation of the die by other dice.

At step 522, the method 500 continues with generating, by the second die, a second digital signature according to the second measure and the second private key. The second digital signature includes a second digest encrypted by the second private key. The second digest includes the second measure.

The second signature can be generated also according to additional information that changes periodically. In general, a digest can include a measure of a die and can be encrypted by the private key of the die. Also, the additional information that changes periodically can include a timestamp, a code, and/or a sequence number, for example. In some embodiments, every time a die of a set of dice sends the measure of itself to the subsequent die, it has to be sent with additional information that changes from time to time (e.g., a timestamp, a code, a sequence number, etc.), so that a threat actor attempting to attack the dice cannot record the content of one communication by the die and then used it to pretend that it is the die.

At step 524, the method 500 continues with communicating, via a second inter-die communication interface of the second die, the second measure, second digital signature, and the second public key to the third die. In some embodiments, the second die can also communicate a second immutable identifier of the second die with the second measure and the second digital signature.

At step 526, the method 500 continues with receiving, via a third inter-die communication interface of the third die, the second measure, the second digital signature, and the second public key.

At step 528, the method 500 continues with validating, by the third die, the second digital signature using the second public key.

At step 530, the method 500 continues with validating, by the third die, the second measure by comparing the second measure to the second validation code. If the validation of the second measure or any other measure of the plurality of dice fails, then the corresponding die is deactivated and content of the corresponding die is prohibited from being read. Alternatively, if the validation of the second measure or any other measure of the plurality of dice fails, then the entire MCP is deactivated and content of the MCP is prohibited from being read.

In some embodiments, the plurality of dice can be arranged in a sequential chain of dice and each die of the chain is configured as being in a specific position in the chain. In such embodiments, the first die can be an initial die in the chain and the second die can be a die in the chain immediately following the first die. Also, in such examples, each die subsequent to the second die in the chain can store a validation code representative of a predetermined measure of firmware and parameters of a preceding die calculated according to the cryptographic algorithm. The subsequent die can also store a measure of the firmware and parameters of the preceding die calculated from the cryptographic algorithm as well as store a digital signature, a public key, and a certificate of the preceding die. The subsequent die can also validate the public key using the certificate, validate the digital signature using the public key, and validate the measure by comparing the measure to a validation code (also known as a "golden value").

In some embodiments, the sequential chain of dice can be validated one die at a time until each die of the chain is validated.

In some embodiments, the first die can be a master die and the other dice of the plurality of dice are slave dice arranged in a sequential chain of slave dice after the master die. The second die in such examples can be an initial die in the sequential chain of slave dice. Also, in such examples, validation of the MCP can occur by the master die validating an authentication message of each slave die. The authentication message can include a digital signature and a measure of the slave die. The digital signature can be validated by a public key of the slave die. The measure can be validated by a validation code of the slave die. And, the validation code can be representative of a predetermined measure of the slave die.

In some embodiments, a slave die of the chain can be configured as being in a specific position in the chain and each slave die can be configured to store the public key, a certificate, and the measure of a preceding die in the chain. The certificate can be used to validate the public key in the slave die.

Specifically, FIG. 6 illustrates operations of method 600 performed by first die 503 and second die 505 of the plurality of dice. In general, the method can be performed by any die of the dice and a subsequent die of the dice. As mentioned herein, the plurality of dice can be dice of a MCP or dice of a plurality of MCP and/or dice distributed over a network. Also, in some embodiments, the operations of method 600 can be performed by an identity composition device for the first and second dice or a respective identity composition device for the first die and a respective identity composition device for the second die (e.g., see the identity composition devices depicted in FIGS. 9 and 10).

In FIG. 6, at step 602, the method 600 begins with storing, by the first die, a secret key. The MCP having the first die can include the secret key embedded within it.

At step 604, the method 600 continues with the first die operating as a master die with respect to the other dice of the plurality of dice.

At step 606, as part of operating as the master die, the first die generates a root layer of information for authentication of the MCP based at least on the stored secret key.

At step 608, as part of operating as the master die, the first die generates a first layer of information for authentication of the MCP based on the root layer of information. The first layer of information can include the first public key, a first certificate for the first die, and an immutable identifier of the first die. The first certificate can be used to validate the first public key received in the second die.

At step 610, the second die generates a second layer of information for authentication of the MCP based on the first layer of information. The second layer of information can include a second public key for the second die, a second certificate for the second die, and an immutable identifier of the second die. And, the second certificate can be used to validate the second public key received in a third die of the plurality of dice.

With respect to the method 500, method 600, or any other method, process, or operation described herein, in some embodiments, a non-transitory computer-readable storage medium stores instructions that, when executed by at least one processing device (such as controller 806 shown in FIG. 8), cause the at least one processing device to perform the method 500, method 600, or any other method, process, or operation described herein, and/or any combination thereof.

FIG. 7 illustrates an example computing system 700 that can implement to secure communications amongst connected dice using asymmetric cryptography, in accordance with some embodiments of the present disclosure. The system 700 includes computing devices 702-712 and one or more communications networks 714. Each of the computing devices 702-712 can include one or more MCPs each of the MCPs have a plurality of dice. The communications network(s) 714 includes at least a wide area network (WAN), a local area network (LAN), an intranet, an extranet, the Internet, and/or any combination thereof.

Each of the computing devices described herein (such as computing devices 702-712) can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated for each of the illustrated computing devices of FIG. 7 as well as the computing device of FIG. 8, the term "machine" shall also be taken to include any collection of machines that individually or jointly execute a set (or multiple sets) of instructions to perform any one or more of the methodologies or operations discussed herein. And, each of the illustrated computing devices can each include at least a bus and/or motherboard, one or more controllers (such as one or more CPUs), a main memory that can include temporary data storage, at least one type of network interface, a storage system that can include permanent data storage, and/or any combination thereof.

Figure 8:
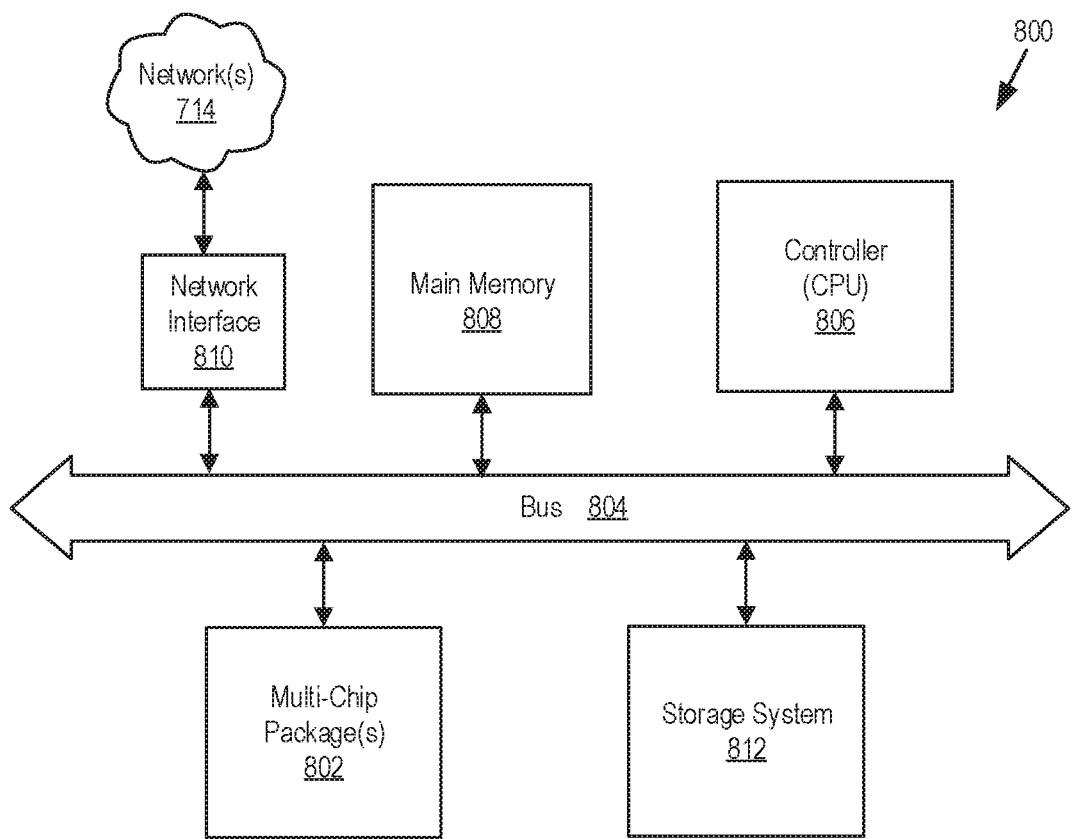
FIG. 8 illustrates example parts of an example computing device, in accordance with some embodiments of the present disclosure.

FIG. 8 illustrates example parts of an example computing device 800, in accordance with some embodiments of the present disclosure. The device 800 can be communicatively coupled to the network(s) 714 as shown. The device 800 includes at least one or more MCPs 802, a bus 804, a controller 806 (such as a CPU), a main memory 808, a network interface 810, and a data storage system 812. The bus 804 communicatively couples the MCP(s) 802, the controller 806, the main memory 808, the network interface 810, and the data storage system 812. The device 800 includes a computer system that includes at least controller 806, main memory 808 (e.g., read-only memory (ROM), flash memory, dynamic random access memory (DRAM) such as synchronous DRAM (SDRAM) or Rambus DRAM (RDRAM), static random access memory (SRAM), etc.), and data storage system 812, which communicate with each other via bus 804 (which can include multiple buses).

To put it another way, FIG. 8 is a block diagram of an example device 800 having a computer system in which embodiments of the present disclosure can operate. In some embodiments, the computer system can include a set of instructions, for causing a machine to perform any one or more of the methodologies discussed herein, when executed. In such embodiments, the machine can be connected (e.g., networked via network interface 810) to other machines in a LAN, an intranet, an extranet, and/or the Internet (e.g., network(s) 714). The machine can operate in the capacity of a server or a client machine in client-server network environment, as a peer machine in a peer-to-peer (or distributed) network environment (such as the peer-to-peer networks described herein), or as a server or a client machine in a cloud computing infrastructure or environment.

Controller 806 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Controller 806 can also be one or more special-purpose processing devices such as an application specific integrated circuit (ASIC), a field programmable gate array (FPGA), a digital signal processor (DSP), network processor, or the like. Controller 806 is configured to execute instructions for performing the operations and steps discussed herein. Controller 806 can further include a network interface device such as network interface 810 to communicate over one or more communications network (such as network(s) 714).

The data storage system 812 can include a machine-readable storage medium (also known as a computer-readable medium) on which is stored one or more sets of instructions or software embodying any one or more of the methodologies or functions described herein. The instructions can also reside, completely or at least partially, within the main memory 808 and/or within the controller 806 during execution thereof by the computer system, the main memory 808 and the controller 806 also constituting machine-readable storage media. While the memory, controller, and data storage parts are shown in the example embodiment to each be a single part, each part should be taken to include a single part or multiple parts that can store the instructions and perform their respective operations. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Figure 9:
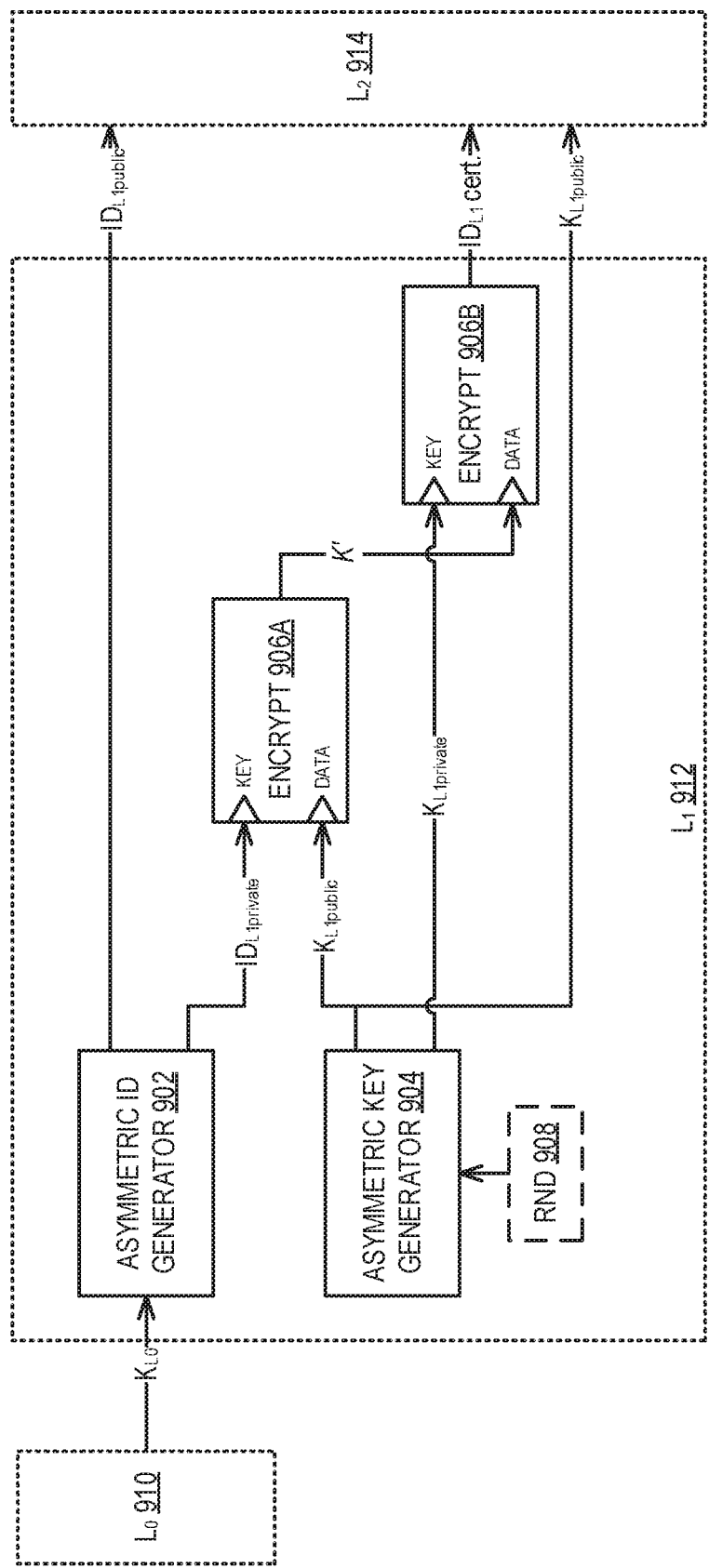
FIG. 9 illustrates an apparatus or non-transitory computer readable storage medium for generating a triple according to some embodiments.

FIG. 9 illustrates an apparatus or non-transitory computer readable storage medium for generating a triple according to some embodiments.

As illustrated, the $L_0$ code 910 (e.g., $L_0$ code of a first or master device or die of a plurality of connected dice described herein) and $L_1$ code 912 (e.g., $L_1$ code of the first or master device or die) operate on an identity composition device (such as an identify composition device that is a part of or connected to the first or master device or die). The identity composition device can be a part of any one of the devices or dice described herein such as any one of the plurality of dice described herein, the stacks or chains described herein, and/or the MCPs described herein, for example. The $L_0$ code 910 can include firmware executing in ROM of the identity composition device and/or firmware on the first or master device or die. The $L_0$ code 910 is responsible for generating a first key ($K_{L0}$) (also referred to as a fuse-derived secret, FDS) according to the following formula: FDS=$K_{L0}$=KDF (UDS, HASH (identity of $L_1$)), where KDF is a one-way function such as an HMAC-SHA256 function, UDS is a unique device secret set during manufacture of the device operating the $L_0$ code 910, HASH includes a second one-way function such as a SHA256 function, and the identify of $L_1$ includes host configuration parameters of the $L_1$ code 912.

The $L_0$ code 910 exports $K_{L0}$ to the $L_1$ code 912 which is then used to generate a triple representing the $L_1$ code 912. This triple is then exported by the $L_1$ code 912 to the $L_2$ code 914. The $L_2$ code 914 can include code executing on a second or following device or die. For example, in some embodiments, the $L_0$ code 910 and $L_1$ code 912 can execute on a first device or die while the $L_2$ 914 can execute on a separate device or die such as a second or following device or die.

Generally, as described, the $L_1$ code 912 is responsible for generating keys (referred to as "alias keys") and a triple for the $L_1$ code 912 itself.

As illustrated, the $L_1$ code 912 generates an identifier for the $L_1$ code 912 via an asymmetric identifier generator 902. The generator 902 takes the $K_{L0}$ key as a seed input and outputs a deterministic public key ($ID_{L1public}$) and private key ($ID_{L1private}$). The $L_1$ code 912 exports the public key ($ID_{L1public}$) to the $L_2$ code 914, the usage of which will be described in the description of FIG. 10.

Additionally, the $L_1$ code 912 generates a second key pair using a second asymmetric key generator 904. This key generator 904 takes a random number generated the random number generator 908 as a seed input and outputs a second deterministic public key ($K_{L1public}$) and private key ($K_{L1private}$). The $L_1$ code 912 exports the public key ($K_{L1public}$) to the $L_2$ code 914, the usage of which will be described in the description of FIG. 10. In some embodiments, an identifier of a device or die (such as a UID of a NAND device or die in a plurality of connected dice) can be combined with the generated random number or be a basis for the random number generator 908 to generate the random number. Also, the input for second asymmetric key generator 904 can include a hash of the generated random number, the identifier of a device or die, a freshness factor (such as a time stamp), other information, and/or any combination thereof.

The L1 code 912 additionally employs a double-encryption technique for generating the ID certificate portion of the triple exported to the L2 code 914. Specifically, the L1 code 912 first encrypts the KL1public key using the IDL1public key as the encryption key using a first encryption module 906A, generating encrypted ciphertext K'. This ciphertext is then used as the data supplied to a second encryption module 906B while the KL1private generated by the second generator 904 is used as the encryption key. The result of the second encryption module 906B is a doubly-encrypted ciphertext K" which is exported as the IDL1 certificate. The specific choice of encryption algorithm (and corresponding decryption algorithm in FIG. 10) is not limited in the disclosure.

Figure 10:
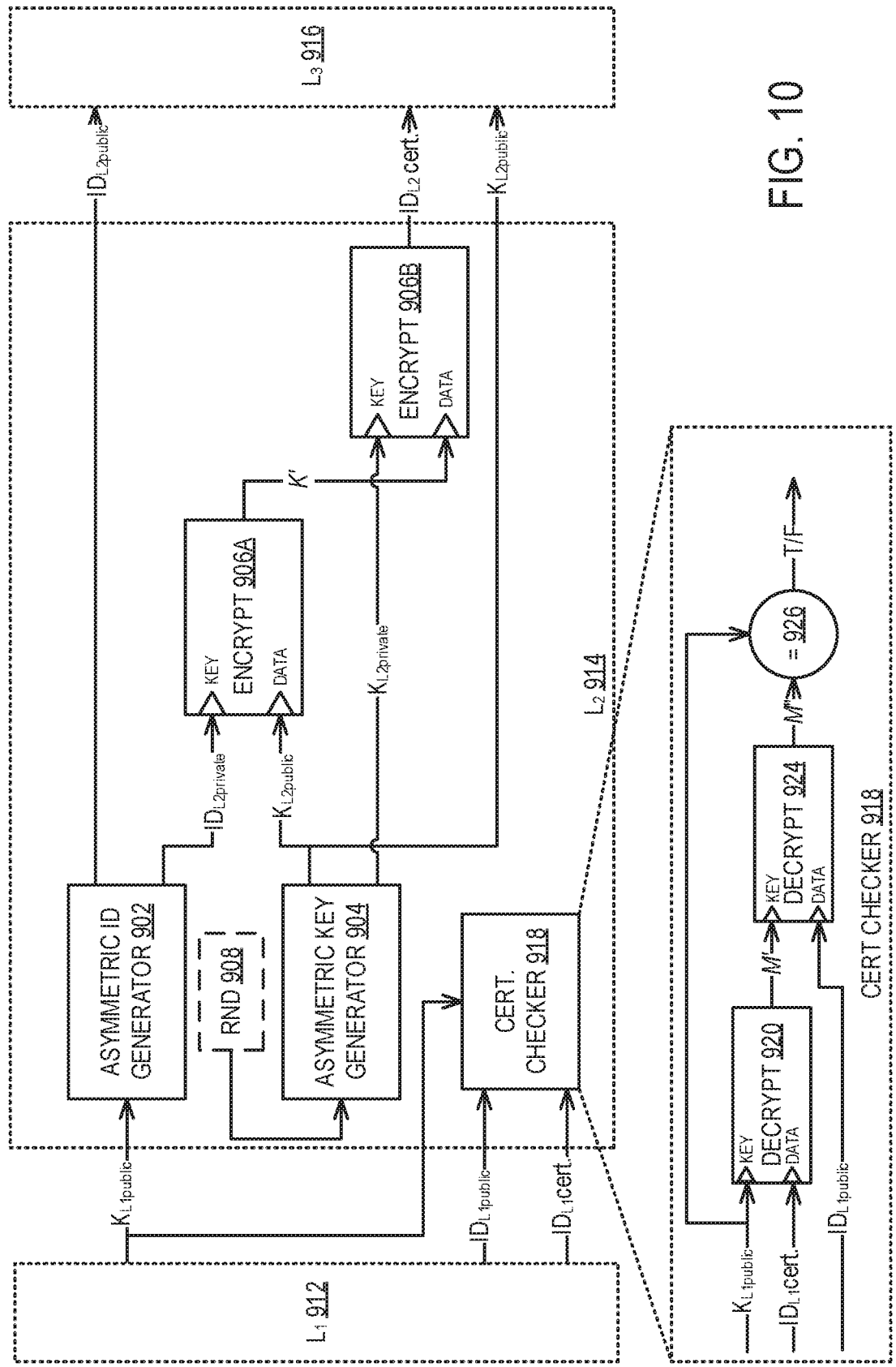
FIG. 10 illustrates an apparatus or non-transitory computer readable storage medium for verifying a triple and generating a second layer triple according to some embodiments.

FIG. 10 illustrates an apparatus or non-transitory computer readable storage medium for verifying a triple and generating a second layer triple according to some embodiments.

The figure illustrated in FIG. 10 illustrates the operation of $L_2$ code 914. However, the operations described herein can be generalized for any layer including and beyond the $L_2$ code 914 (e.g., $L_3$ code 916, $L_4$ code, ... $L_n$ code). $L_2$ code 914 can operate on the identity composition device or a second identity composition device. Also, for example, an $L_n$ code can operate on the identity composition device or an nth identity composition device.

In the illustrated embodiment, the $L_2$ code 914 receives a triple from $L_1$ code 912, generated as described in FIG. 9. $L_2$ code 914 performs operations similar to that of $L_1$ code 912 with respect to generating a $L_2$ triple and those details are not repeated herein but are incorporated by reference for identically numbered elements. One notable difference in the triple-generation circuitry or software is that the first generator is seeded with the $K_{L1public}$ value generated by the $L_1$ code 912 and not the value of $K_{L0}$ (the fuse-derived secret) as described in FIG. 9.

Additionally, the $L_2$ code 914 includes a certificate checker 918 which may be implemented in hardware (i.e., a dedicated circuit) or in software or firmware. Details of the certificate checker 918 are shown in exploded view in the figure. The certificate checker 918 verifies the authenticity of the triple received from the $L_1$ code 912. In some embodiments, the certificate checker 918 acts as a gating function to the remaining components (i.e., preventing the generation of an $L_2$ triple if the triple is not valid).

As illustrated, the certificate checker 918 decrypts the $ID_{L1}$ certificate using the $K_{L1}$ public key via first decryption module 920. The resulting key M' is then used as the key for a second decryption module 924 which use the key M' to decrypt the $ID_{L1}$ public key. Finally, the resulting plaintext M" is compared to the original public key ($K_{L1public}$) via comparator 926. If the result of the comparator is positive, the triple is confirmed as valid. If not, the triple is marked as invalid.

In the illustrated embodiment, the certificate checker 918 can execute independently of the triple generation circuitry/software 902, 904, 906a-b. In this manner, triples of various entities can be verified by the $L_2$ code 914.

It is to be understood that SHA256 is just one example hash function of many different types of hash functions that can be used with embodiments described herein. For example, any one or more cryptographic hash functions can be used such as any variation of MD5, SHA-1, SHA-2, SHA-3, BLAKE2, RIPEMD-160, Whirlpool, or any combination thereof.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A multi-chip package (MCP), comprising:
  a first die of a plurality of dice, configured to:
    generate a first measure of firmware and parameters of the first die using a cryptographic algorithm;
    generate a first public key and a first private key;
    generate a first digital signature according to the first measure and the first private key, the first digital signature comprising a first digest encrypted by the first private key;
    communicate, via a first inter-die communication interface, the first measure, the first digital signature, and the first public key to a second die of the plurality of dice; and
  the second die of the plurality of dice, configured to:
    store first validation code representative of the first measure of the firmware and the parameters of the first die using the cryptographic algorithm;
    receive, via a second inter-die communication interface, the first measure, the first digital signature, and the first public key;
    validate the first digital signature using the first public key; and
    validate the first measure by comparing the first measure to the first validation code.

2. The MCP of claim 1, wherein the first digital signature is also generated according to additional information that changes periodically.

3. The MCP of claim 1, wherein the first die is further configured to communicate a first immutable identifier of the first die with the first measure and the first digital signature.

4. The MCP of claim 1, wherein the second die is further configured to:
generate a second measure of firmware and parameters of the second die using the cryptographic algorithm;
generate a second public key and a second private key;
generate a second digital signature according to the second measure and the second private key, the second digital signature comprising a second digest encrypted by the second private key, the second digest comprising the second measure; and
communicate, via a second inter-die communication interface, the second measure, the second digital signature, and the second public key to a third die of the plurality of dice.

5. The MCP of claim 4, wherein second digital signature is also generated according to additional information that changes periodically.

6. The MCP of claim 4, wherein the second die is further configured to communicate a second immutable identifier of the second die with the second measure and the second digital signature.

7. The MCP of claim 1, wherein the cryptographic algorithm comprises a hash function, and wherein the first measure comprises hash values.

8. The MCP of claim 1, further comprising an embedded secret key, wherein the first die is configured to:
store the secret key; and
operate as a master die with respect to the other dice of the plurality of dice.

9. The MCP of claim 8, wherein the first die comprises a first identity composition device configured to:
generate a root layer of information for authentication of the MCP based at least on the stored secret key; and
generate a first layer of information for authentication of the MCP based on the root layer of information, wherein the first layer of information comprises the first public key, a first certificate for the first die, and an immutable identifier of the first die, and wherein the first certificate is used to validate the first public key received in the second die.

10. The MCP of claim 9, wherein the second die comprises a second identity composition device, and wherein the second identity composition device is configured to:
generate a second layer of information for authentication of the MCP based on the first layer of information, wherein the second layer of information comprises a second public key for the second die, a second certificate for the second die, and an immutable identifier of the second die, and wherein the second certificate is used to validate the second public key received in a third die of the plurality of dice.

11. The MCP of claim 1, wherein the plurality of dice is arranged in a sequential chain of dice and each die of the chain is configured as being in a specific position in the chain, wherein the first die is an initial die in the chain, wherein the second die is a die in the chain immediately following the first die, and wherein each die subsequent to the second die in the chain is configured to:
store a validation code representative of a predetermined measure of firmware and parameters of a preceding die calculated according to the cryptographic algorithm;
store a measure of the firmware and parameters of the preceding die calculated from the cryptographic algorithm;
store a digital signature, a public key, and a certificate of the preceding die;
validate the public key using the certificate;
validate the digital signature using the public key; and
validate the measure by comparing the measure to the validation code.

12. The MCP of claim 11, wherein the sequential chain of dice is validated one die at a time until each die of the chain is validated.

13. The MCP of claim 1, wherein the first die is a master die and the other dice of the plurality of dice are slave dice arranged in a sequential chain of slave dice after the master die, and wherein the second die is an initial die in the sequential chain of slave dice.

14. The MCP of claim 13, wherein validation of the MCP occurs by the master die validating an authentication message of each slave die, wherein the authentication message comprises a digital signature and a measure of the slave die, wherein the digital signature is validated by a public key of the slave die, wherein the measure is validated by a validation code of the slave die, and wherein the validation code is representative of a predetermined measure of the slave die.

15. The MCP of claim 14, wherein each slave die of the chain is configured as being in a specific position in the chain and each slave die is configured to store the public key, a certificate, and the measure of a preceding die in the chain, and wherein the certificate is used to validate the public key in the slave die.

16. The MCP of claim 1, wherein if the validation of the first measure or any other measure of the plurality of dice fails, then the MCP is deactivated and content of the MCP is prohibited from being read.

17. The MCP of claim 1, wherein if the validation of the first measure or any other measure of the plurality of dice fails, then the corresponding die is deactivated and content of the corresponding die is prohibited from being read.

18. The MCP of claim 1, wherein the first die comprises a first NAND device, and wherein the second die comprises a second NAND device.

19. A method, comprising:
generating, by a first die of a plurality of dice in a package, a first measure of firmware and parameters of the first die using a cryptographic algorithm;
generating, by the first die, a first public key and a first private key;
generating, by the first die, a first digital signature according to the first measure and the first private key, the first digital signature comprising a first digest encrypted by the first private key;
communicating, via a first inter-die communication interface of the first die, the first measure, the first digital signature, and the first public key to a second die of the plurality of dice;
storing, by the second die, a first validation code representative of the first measure of the firmware and the parameters of the first die based on the cryptographic algorithm;
receiving, via a second inter-die communication interface of the second die, the first measure, the first digital signature, and the first public key;
validating, by the second die, the first digital signature using the first public key; and
validating, by the second die, the first measure by comparing the first measure to the first validation code.

20. A method, comprising:

generating, by a first die of a plurality of dice distributed over a network, a first measure of firmware and parameters of the first die using a cryptographic algorithm;

generating, by the first die, a first public key and a first private key;

generating, by the first die, a first digital signature according to the first measure and the first private key, the first digital signature comprising a first digest encrypted by the first private key;

communicating, via a first inter-die communication interface of the first die, the first measure, the first digital signature, and the first public key to a second die of the plurality of dice;

storing, by the second die, a first validation code representative of the first measure of the firmware and the parameters of the first die based on the cryptographic algorithm;

receiving, via a second inter-die communication interface of the second die, the first measure, the first digital signature, and the first public key;

validating, by the second die, the first digital signature using the first public key; and validating, by the second die, the first measure by comparing the first measure to the first validation code.

* * * * *